(12) United States Patent
Delprat et al.

(10) Patent No.: US 8,475,915 B2
(45) Date of Patent: Jul. 2, 2013

(54) METHACRYLIC COMPOSITION FOR OBTAINING A COATING HAVING A ROUGH TEXTURE AND A MATT APPEARANCE

(75) Inventors: Patrick Delprat, Lescar (FR); Jerome Berge, Monein (FR)

(73) Assignee: Arkema France, Colombes (FR)

( * ) Notice: Subject to any disclaimer, the term of this patent is extended or adjusted under 35 U.S.C. 154(b) by 812 days.

(21) Appl. No.: 12/514,695

(22) PCT Filed: Nov. 8, 2007

(86) PCT No.: PCT/FR2007/052316
§ 371 (c)(1),
(2), (4) Date: Feb. 12, 2010

(87) PCT Pub. No.: WO2008/059157
PCT Pub. Date: May 22, 2008

(65) Prior Publication Data
US 2010/0143629 A1 Jun. 10, 2010

(30) Foreign Application Priority Data
Nov. 13, 2006 (FR) ...................................... 06 54854

(51) Int. Cl.
*B32B 5/16* (2006.01)
*B32B 27/36* (2006.01)
*B32B 27/06* (2006.01)
*B32B 27/00* (2006.01)
*B32B 27/08* (2006.01)

(52) U.S. Cl.
USPC ........... 428/323; 428/327; 428/412; 428/483; 428/500; 428/515

(58) Field of Classification Search
None
See application file for complete search history.

(56) References Cited

U.S. PATENT DOCUMENTS

| | | | | |
|---|---|---|---|---|
| 3,345,434 | A | * | 10/1967 | McDonald .................... 525/228 |
| 4,876,311 | A | * | 10/1989 | Hennig et al. ................ 525/229 |
| 2005/0013962 | A1 | | 1/2005 | Ederle et al. |
| 2005/0233124 | A1 | | 10/2005 | Marot et al. |

* cited by examiner

*Primary Examiner* — Sheeba Ahmed
(74) *Attorney, Agent, or Firm* — Thomas F. Roland

(57) ABSTRACT

The invention relates to a methacrylic composition comprising (100-x-y) parts of at least one methacrylic polymer comprising a MMA homo- or copolymer containing dispersed therein: x parts of particles of a thermoplastic polymer A containing MMA as a majority monomer which is crosslinked or has a weight-average mass $M_w$>300,000 g/mol, (in relation to a PMMA standard), with a weight-average diameter (ASTM D1921)>100 μm, and <500 μm; and y parts of particles of a crosslinked thermoplastic polymer comprising MMA as a majority monomer, with a weight-average diameter (ASTM D1921) ranging from 15 to 70 μm; such that x varies between 2 to 20 and y varies between 10 to 25. Preferably, x+y<33. The invention also relates to a multilayer structure consisting of: a layer (I) comprising the inventive methacrylic composition; a layer (II) comprising at least one thermoplastic polymer, and an optional intermediate layer between layers (I) and (II).

20 Claims, 2 Drawing Sheets

METHACRYLIC COMPOSITION FOR OBTAINING A COATING HAVING A ROUGH TEXTURE AND A MATT APPEARANCE

This application claims benefit, under U.S.C. §119 or §365 of French Application Number FR 0654854, filed Nov. 13, 2006; and PCT/FR2007/052316 filed Nov. 8, 2007.

FIELD OF THE INVENTION

The invention relates to a methacrylic composition that enables a coating to be obtained which has a rough feel, matt appearance and which is scratch and UV resistant. The composition comprises a methacrylic polymer, in which thermoplastic polymer particles with an average diameter ranging from 15 to 70 μm and thermoplastic polymer particles with an average diameter ranging from 100 to 400 μm are dispersed. This composition may be extruded or coextruded onto a thermoplastic polymer.

BACKGROUND OF THE INVENTION

The problem that the invention intends to solve is to develop a composition that, when it is extruded or coextruded, gives a surface with a rough feel, matt appearance and that is scratch and UV resistant. The composition must be easily processable under normal processing conditions, that is to say that it must be easily extrudable or coextrudable onto a thermoplastic polymer. The extruded or coextruded part must also have an adequate mechanical strength. The rough feel and the matt appearance may be characterized/quantified respectively by the roughness and the gloss of the surface of the extruded or coextruded part. Under well-defined processing conditions, the composition of the invention makes it possible to obtain a rough feel characterized by a roughness Ra>8 μm and a matt appearance quantified by a gloss <10%, indeed <4% (at an angle of 60°).

International application WO 01/12719 describes a methacrylic composition comprising from 0.5 to 50% of particles whose average size is greater than 100 μm, comprising MMA and optionally a comonomer, these particles possibly being crosslinked. The composition may be coextruded according to the capstock process onto a thermoplastic polymer such as PVC.

International application WO 97/14749 describes a methacrylic composition comprising crosslinked particles, whose average size ranges from 250 to 600 μm, dispersed in a PMMA obtained by the cast process.

U.S. Pat. No. 3,345,434 describes a composition having a rough feel obtained by blending an uncrosslinked thermoplastic polymer with particles of a crosslinked thermoplastic polymer. It could be for example a PMMA in which particles of crosslinked PMMA are dispersed.

U.S. Pat. No. 4,876,311 describes a dispersion of crosslinked particles in a thermoplastic polymer whose average diameter may vary between 5 and 50 μm.

European application EP 1 022 115 describes a methacrylic composition having a frosted appearance and surface roughness comprising highly crosslinked particles consisting of styrene and an alkyl (meth)acrylate having an average diameter ranging from 15 to 70 μm and a size distribution ranging from 10 to 110 μm.

SUMMARY OF THE INVENTION

The invention relates to a methacrylic composition comprising (100-x-y) parts of at least one methacrylic polymer that is a homopolymer or copolymer of methyl methacrylate MMA, dispersed in which are:

x parts of particles of a thermoplastic polymer A comprising MMA as the main monomer that is either crosslinked or that has a weight-average molecular weight $M_w$>300 000 g/mol, advantageously >400 000 g/mol (relative to a PMMA standard), with a weight-average diameter (ASTM D1921)>100 μm, advantageously >250 μm and <500 μm, advantageously <400 μm;

y parts of particles of a crosslinked thermoplastic polymer B comprising MMA as the main monomer, with a weight-average diameter (ASTM D1921) ranging from 15 to 70 μm;

such that x varies from 2 to 20 and y varies from 10 to 25.

Preferably, x+y<33. The invention also relates to the process of coextruding the composition according to the invention with a thermoplastic polymer and also to the multilayer structure comprising one layer consisting of the methacrylic composition according to the invention and one thermoplastic polymer layer. The invention also relates to the uses of the multilayer structure.

DETAILED DESCRIPTION OF THE INVENTION

Figure 1:
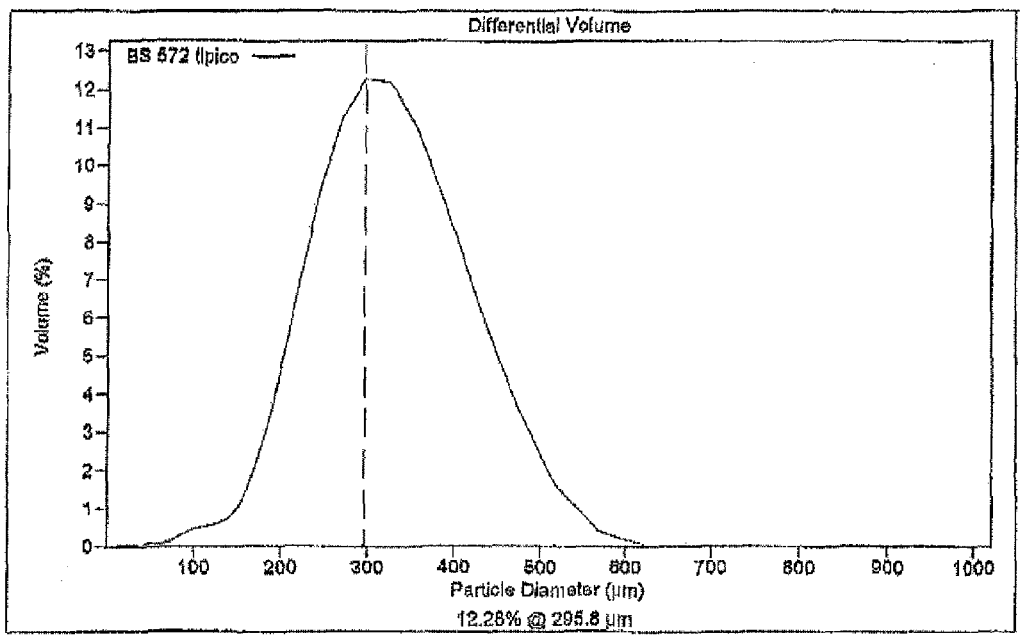
FIG. 1 represents a size distribution curve for the polymer A particles used in the examples.
Figure 2:
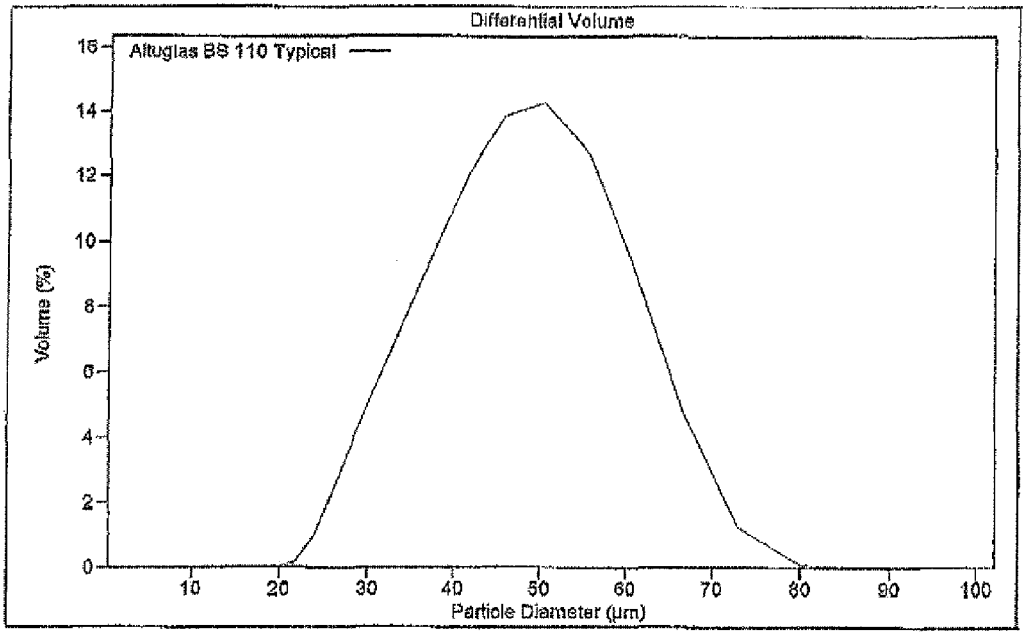
FIG. 2 represents a size distribution curve for the polymer B particles used in the examples.

Regarding the methacrylic polymer, in which the particles are dispersed, this is a homopolymer or copolymer of MMA, comprising, by weight, at least 50%, preferably 75%, of MMA. The copolymer is obtained from MMA and at least one comonomer that is copolymerizable with MMA. Preferably, the copolymer comprises, by weight, from 70 to 99.5%, advantageously from 80 to 99.5%, preferably from 80 to 99% of MMA per 0.5 to 30%, advantageously 0.5 to 20%, preferably 1 to 20% respectively of the comonomer.

Preferably, the comonomer that is copolymerizable with MMA is a (meth)acrylic monomer or a vinyl aromatic monomer such as, for example, styrene, substituted styrenes, α-methylstyrene, monocholorostyrene or tert-butyl styrene. Preferably, it is an alkyl (meth)acrylate, especially methyl acrylate, ethyl acrylate, propyl acrylate, butyl acrylate or butyl methacrylate.

The methacrylic polymer is prepared by radical polymerization according to the techniques known to a person skilled in the art. The polymerization may be carried out in solution, in bulk, in emulsion, or in suspension. The methacrylic polymer may also be prepared by anionic polymerization. The melt flow index (MFI) of the methacrylic polymer preferably ranges from 0.5 to 30 g/10 min (230° C./3.8 kg). An example of a methacrylic polymer that can be used is the grade ALTUGLAS® HFI-7 sold by Altuglas International, the characteristics of which are given in the examples.

The term "(meth)acrylic monomer" denotes a monomer which may be:

an acrylic monomer such as alkyl acrylates, the alkyl group preferably being a $C_1$-$C_{10}$ alkyl group, cycloalkyl acrylates or aryl acrylates, such as methyl, ethyl, propyl, n-butyl, isobutyl, tert-butyl or 2-ethylhexyl acrylate, hydroxyalkyl acrylates such as 2-hydroxyethyl acrylate, etheralkyl acrylates such as 2-methoxyethyl acrylate, alkoxypolyalkylene glycol or aryloxypolyalkylene glycol acrylates such as methoxypolyethylene glycol or ethoxypolyethylene glycol acrylates, aminoalkyl acrylates such as 2-(dimethylamino)ethyl acrylate, silyl acrylates or glycidyl acrylate; and a methacrylic monomer such as alkyl methacrylates, the alkyl group preferably being a $C_2$-$C_{10}$ alkyl group, cycloalkyl methacrylates or aryl methacrylates, such as ethyl, propyl, n-butyl, isobutyl, tert-butyl or 2-ethylhexyl methacrylate, hydroxyalkyl methacrylates such as 2-hydroxyethyl methacrylate, etheralkyl methacrylates such as 2-methoxyethyl methacrylate, alkoxypolyalkylene glycol or aryloxypolyalkylene glycol methacrylates such as methoxypolyethylene glycol or ethoxypolyethylene glycol methacrylates, aminoalkyl methacrylates such as 2-(dimethylamino)ethyl methacrylate, silyl methacrylates or glycidyl methacrylate.

Regarding the thermoplastic polymer A particles, these are characterized by a weight-average diameter (according to ASTM D1921)>100 μm, advantageously >250 μm. The weight-average diameter is also <500 μm, advantageously <400 μm. These particles may be prepared for example by suspension polymerization. The particles may also be obtained by milling a part such as a sheet or some granules made of the polymer A. Depending on the method for obtaining them, they may be spherical or approximately spherical or have a more irregular shape. Preferably, they are prepared by suspension polymerization and have a spherical or approximately spherical shape. In addition, the size distribution advantageously has a standard deviation of at most 40%, preferably at most 35% (relative to the average diameter). This makes it possible to obtain a more homogeneous roughness.

Polymer A is either crosslinked or it has a high molecular weight, that is to say that it has a weight-average molecular weight $M_w$>300 000 g/mol, advantageously >400 000 g/mol (PMMA standard). This enables the particles to retain their integrity during compounding with the methacrylic polymer. However, a high molecular weight polymer is preferred to a crosslinked polymer as then the particles may be slightly melted and crushed, which contributes to a more homogeneous surface appearance.

Polymer A comprises MMA as the main monomer, that is to say comprising, by weight, more than 65%, advantageously more than 75% of MMA. It could be a polymethyl methacrylate or a copolymer of MMA and at least one comonomer that is copolymerizable with MMA by radical processing. The comonomer may be a vinyl aromatic such as for example styrene and/or a (meth)acrylic monomer.

Regarding the thermoplastic polymer B particles, these have a weight-average diameter (according to ASTM D1929) ranging from 15 to 70 μm. Depending on the method for obtaining them, they may be spherical or approximately spherical or have a more irregular shape. Preferably, they are prepared by suspension polymerization and have a spherical or approximately spherical shape. In addition, the size distribution advantageously has a standard deviation of at most 40%, preferably at most 30% (relative to the average diameter). This makes it possible to obtain a homogeneity in the surface appearance.

For certain applications, the coating is rendered translucent and has a frosted appearance; for this, it is arranged so that the refractive indices of the polymer B particles and of the methacrylic polymer are different (at 20° C.) by more than 0.02 (ISO R-489).

Polymer B comprises MMA as the main monomer, that is to say comprising, by weight, more than 65%, advantageously more than 75% of MMA. The polymer may be a polymethyl methacrylate or a copolymer of MMA and at least one comonomer that is copolymerizable with MMA by radical processing. The comonomer may be a vinyl aromatic such as, for example, styrene and/or a (meth)acrylic monomer. A person skilled in the art will adapt the composition of the particles so as to obtain the desired difference between the methacrylic polymer/particles refractive indices. The refractive index of an XY copolymer may be estimated using the formula $n_{XY}=C_X n_X + C_Y n_Y$ in which $C_X$ and $C_Y$ denote the weight contents of the two monomers X and Y and $n_X$ and $n_Y$ denote the refractive indices of the X and Y homopolymers (see Polymer Handbook, 2nd edition, 1975, Wiley, "Refractive indices of polymers", III-241).

Crosslinking is obtained using at least one crosslinking agent that may, for example, be an allyl (meth)acrylate, divinylbenzene, a dimethacrylate or trimethacrylate such as polyethylene glycol dimethacrylate. Preferably, the particles are highly crosslinked so as to retain their integrity during compounding with the methacrylic polymer, that is to say that they are insoluble in a polar organic solvent such as tetrahydrofuran (THF) or methylene chloride. This is why, preferably, the amount of crosslinking agent in the particles is greater than 0.6%, advantageously greater than 0.8%.

Preferably, polymer B comprises, by weight, from 15 to 35% of styrene and from 65 to 85% of MMA. Examples of preparing B particles are given in examples 2A, 2B and 2C of the patent EP 1 022 115 B1. In these examples, the particles are in the form of approximately spherical particles and comprise about 25% of styrene and 75% of MMA.

Regarding the methacrylic composition, this comprises x parts of polymer A particles and y parts of polymer B particles dispersed in (100-x-y) parts of at least one methacrylic polymer. Preferably, x+y<33. The number of x parts varies from 2 to 20 and the number of y parts varies from 10 to 25. Advantageously, x varies from 3 to 10 and preferably from 3 to 8. Similarly, y advantageously varies from 15 to 25, preferably from 17 to 23.

The composition may be prepared by dispersing the particles in the methacrylic polymer (matrix) in the melt state (compounding). For this, an extruder or a kneader is for example used. It is preferred to use extrusion so as to recover granules that are then processed, for example by coextrusion onto a thermoplastic polymer.

The methacrylic composition, once extruded or coextruded, enables a surface to be obtained:

having a rough feel, similar to the rough feel of certain metal parts such as aluminium sheets (or certain thermoplastic parts);

having a roughness, Ra>8 μm;

having a homogeneous matt appearance (gloss <10%, advantageously <8%, preferably <4% at an angle of 60°); and being scratch and UV resistant.

This is obtained by dispersing, in the methacrylic polymer, the particles in the proportions indicated above. The rough feel is mainly due to the polymer A particles and is only obtained on the condition of having a minimum of two parts of polymer A particles. The polymer B particles also contribute to the rough feel but to a lesser degree. The homogeneous matt appearance is mainly due to the polymer B particles and is only obtained on the condition of having a minimum of 10 parts of polymer B particles. The particles A also contribute to the mattness (and also indirectly by increasing the roughness). Therefore x+y<45, but so as to retain the mechanical properties of the methacrylic polymer and its processability, it is preferred to limit the total content of particles to 33 parts (x+y<33).

The particles disperse more effectively in the methacrylic polymer than particles of a mineral filler such as, for example, silica, alumina or talc. On the other hand, the forming and processing properties, and also the optical properties, are less affected in the presence of these particles than in the presence of mineral filler particles. As for the optical properties, the composition retains a certain transparency relative to the methacrylic polymer whereas a mineral filler causes a high opacification.

Another role of the polymer B particles is to reduce or remove the longitudinal striations (or other surface defects) that are produced when the composition passes through the extrusion die and/or the sizing die during extrusion or coextrusion. The number of defects depends on the quality of the tooling.

The methacrylic composition may also comprise one or more conventional additives chosen from antioxidants, antistatic agents, flame retardants, pigments and/or dyes, impact modifiers, etc. It is not excluded that the additive is a polymer such as, for example, PVDF or a polyether/polyamide block copolymer of the PEBAX type.

Regarding the thermoplastic polymer that is coextruded with the composition according to the invention, this may be, for example, a saturated polyester such as polyethylene terephtalate PET or PETG, or polybutylene terephtalate PBT, acrylonitrile-butadiene-styrene terpolymer ABS, SAN (styrene-acrylonitrile copolymer), ASA (acrylonitrile-styrene-acrylate copolymer), a polystyrene PS (crystal or impact), a polypropylene (PP), a polyethylene (PE), polycarbonate (PC), polyphenylene oxide PPO, a polysulphone, a vinyl chloride polymer such as PVC, chlorinated PVC (CPVC) or expanded PVC. It may also be a blend of two or more thermoplastic polymers from the previous list. For example, it could be a PPO/PS or PC/ABS blend.

The invention also relates to the coextrusion process consisting in superposing, in order:
 a layer (I) comprising the methacrylic composition according to the invention; and
 a layer (II) comprising at least one thermoplastic polymer.

Optionally, an interlayer may be placed between layers (I) and (II) (that is to say that, placed against one another in order, are: layer (I)/interlayer/layer (II)). This may have, for example, the role of ensuring the adhesion between the two layers (I) and (II). An example of an interlayer ensuring adhesion between the layers is given, for example, in WO 2006/053984.

The invention also relates to a multilayer structure comprising:
 a layer (I) comprising the methacrylic composition according to the invention; and
 a layer (II) comprising the thermoplastic polymer,
and also an optional interlayer placed between layers (I) and (II).

This process is especially suitable for manufacturing solid extruded strips or hollow profiles made from a thermoplastic polymer, especially PVC or ABS. The multilayer structure, especially in the form of strips and profiles, finds applications in the manufacture of panels, cladding, garden edging, windows, shutters, etc. The invention also relates to these strips and profiles and also to their uses.

The thickness of layer (I) is generally lower than that of layer (II) and varies, after the coextrusion, preferably from 100 to 1000 µm. This thickness may vary when the multilayer structure is optionally processed in a subsequent step such as, for example, in a thermoforming step.

EXAMPLES

Products Used
A particles: the grade BS-572 (poly(methyl methacrylate)) sold by Altuglas International was used:
 average diameter: 300 µm;
 glass transition temperature: 114° C.;
 bulk density: 0.7 g/cm$^3$; and
 intrinsic viscosity: 170 cm$^3$/g.
B particles: the grade BS-110 sold by Altuglas International was used:
 average diameter: 50 µm;
 glass transition temperature: 108° C.; and
 bulk density: 0.6 g/cm$^3$.
Methacrylic polymer (PMMA): the grade HFI-7 sold by Altuglas International was used:
 melt flow index: 10 g/10 min (230° C./3.8 kg);
 refractive index (ASTM D542): 1.49; and
 haze (ASTM D1003): <2%.
Extrusion and Coextrusion The A and B particles were dispersed, in the amounts given in Table I, using a Buss kneader to obtain granules of the methacrylic composition. Next, the previous composition was extruded onto a rigid PVC to obtain cellular extruded profiles of the garden enclosure type, the internal wall of which was made from two layers (I) and (II). Layer (I) had a thickness of around 200 µm and layer (II) (PVC) had an average thickness of 1.5 mm.

Measurements Carried Out
Gloss: a BYK-Gardner device was used and the gloss was measured according to the ASTM D523 standard.
Surface roughness: a Veeco Dektak 8 mechanical profiler was used. Ra denotes the arithmetic mean roughness and is calculated using the formula:

$$Ra = \frac{1}{L_m}\int_0^{L_m} |y|dx$$

Rq denotes the quadratic mean roughness and is calculated using the formula:

$$Rq = \sqrt{\frac{1}{L_m}\int_0^{L_m} y^2 dx}$$

More details will be found in the DIN 4768/1 standard.
Scan length: 10 mm
Scan duration: 90 s
Stylus force: 5 mg
The measurements were carried out using five scans per sample.

TABLE I

| Ex. | PMMA | A particles (large particles) | B particles (small particles) | 60° gloss (ASTM D 523) | Ra mean roughness (μm) | Rq mean roughness (μm) |
|---|---|---|---|---|---|---|
| 1 (comp.) | 80% | 20% | 0% | 12 | 8.8 | 11.3 |
| 2 (comp.) | 70% | 30% | 0% | 8 | 11.6 | 14.6 |
| 3 (inv) | 80% | 10% | 10% | 4.5 | 10.2 | 12.8 |
| 4 (comp.) | 82% | 0% | 18% | 3 | 6.0 | 7.2 |
| 5 (inv.) | 75% | 5% | 20% | 2 | 9.9 | 12.3 |

Comments
Ex. 1: the product does not have a gloss <4%.
Ex. 2: if the amount of A particles is increased, the gloss decreases but remains >4%.
Ex. 4: when only B particles are used, a roughness <8 μm is obtained.

The invention claimed is:

1. Methacrylic composition comprising (100-x-y) parts of at least one methacrylic polymer that is a homopolymer or copolymer of methyl methacrylate (MMA) having dispersed therein:
   x parts of particles of a thermoplastic polymer A comprising MMA as the main monomer that is either crosslinked or that has a weight-average molecular weight $M_w$>300,000 g/mol (relative to a PMMA standard), with a weight-average diameter (ASTM D1921)>100 μm, and <500 μm;
   y parts of particles of a crosslinked thermoplastic polymer B comprising MMA as the main monomer, with a weight-average diameter (ASTM D1921) ranging from 15 to 70 μm;
   such that x is in the range of 2 to 20 and y is in the range of 10 to 25.

2. Composition according to claim 1, in which x+y<33.

3. Composition according to claim 1, in which x is in the range of 3 to 10.

4. Composition according to claim 1, in which y is in the range of 15 to 25.

5. Composition according to claim 1, in which the arithmetic mean roughness Ra>8 μm.

6. Composition according to claim 1, in which the gloss<10%, at an angle of 60°.

7. Composition according to claim 1, in which the size distribution of the thermoplastic polymer A particles has a standard deviation of at most 40%.

8. Composition according to claim 1, in which the thermoplastic polymer A comprises, by weight, more than 65% of MMA monomer units.

9. Composition according to claim 8, in which the thermoplastic polymer A is a polymethyl methacrylate or a copolymer of MMA and at least one comonomer that is copolymerizable with MMA by radical processing.

10. Composition according to claim 1, in which the size distribution of the thermoplastic polymer B particles has a standard deviation of at most 40%.

11. Composition according to claim 1, in which the thermoplastic polymer B is a crosslinked polymer comprising, by weight, more than 65% MMA monomer units.

12. Composition according to claim 11, in which the thermoplastic polymer B is a polymethyl methacrylate or a copolymer of MMA and at least one comonomer that is copolymerizable with MMA by radical processing.

13. Composition according to claim 11, in which the thermoplastic polymer B comprises, by weight, from 15 to 35% of styrene monomer units and from 65 to 85% of MMA monomer units.

14. Multilayer structure comprising:
   a layer (I) comprising the methacrylic composition according to claim 1; and
   a layer (II) comprising at least one thermoplastic polymer, and an optional interlayer placed between layers (I) and (II).

15. Structure according to claim 14, in which the thermoplastic polymer is a saturated polyester, an acrylonitrile-butadiene-styrene terpolymer ABS, a styrene-acrylonitrile copolymer SAN, ASA (acrylonitrile-styrene-acrylate copolymer), a polystyrene, a polypropylene, a polyethylene, polycarbonate, a polyphenylene oxide PPO, a polysulphone, a vinyl chloride polymer such as PVC, chlorinated PVC (CPVC) or expanded PVC.

16. Structure according to claim 14, wherein said structure comprises a solid extruded strip or hollow profile.

17. The structure according to claim 14 comprising panels, cladding, garden edging, windows or shutters.

18. Composition according to claim 1, wherein said particles of thermoplastic polymer A have a weight-average molecular weight $M_w$>400,000 g/mol (relative to a PMMA standard), with a weight-average diameter (ASTM D1921)>250 μm and <500 μm.

19. Composition of claim 1, wherein;
   y is in the range of 17 to 23;
   the gloss is <4% at an angle of 60°;
   the thermoplastic polymer A comprises, by weight, more than 75% of MMA monomer units; and
   thermoplastic polymer B comprises more than 75% of MMA monomer units.

20. The structure according to claim 14, wherein said structure is formed in a coextrusion process.

* * * * *